United States Patent

Molinare

[15] 3,649,080
[45] Mar. 14, 1972

[54] HUB CAP CONSTRUCTION

[72] Inventor: Anthony W. Molinare, Wilmette, Ill.

[73] Assignee: Dutton-Lainson Company

[22] Filed: June 22, 1970

[21] Appl. No.: 48,205

[52] U.S. Cl. ....................................301/108 R, 308/187
[51] Int. Cl. .................................................B60b 27/00
[58] Field of Search ...............301/108 R, 108 TW, 108 A;
308/187.1, 187, 95, 96

[56] References Cited

UNITED STATES PATENTS

| 3,460,874 | 8/1969 | Johnson | 308/187.2 |
| 3,393,015 | 7/1968 | Kaufman | 301/108 |
| 1,660,728 | 2/1928 | Stokes | 308/96 X |
| 1,776,641 | 9/1930 | Smith | 301/108 |
| 3,077,948 | 2/1963 | Law | 301/108 X |

Primary Examiner—Richard J. Johnson
Attorney—Molinare, Allegretti, Newitt & Witcoff

[57] ABSTRACT

A hub cap construction for attachment to a hub of a wheel of a boat trailer for enclosing the end of the axle and bearing assemblies and adapted to contain lubricant for the axle and bearing assemblies.

1 Claim, 6 Drawing Figures

Patented March 14, 1972 3,649,080
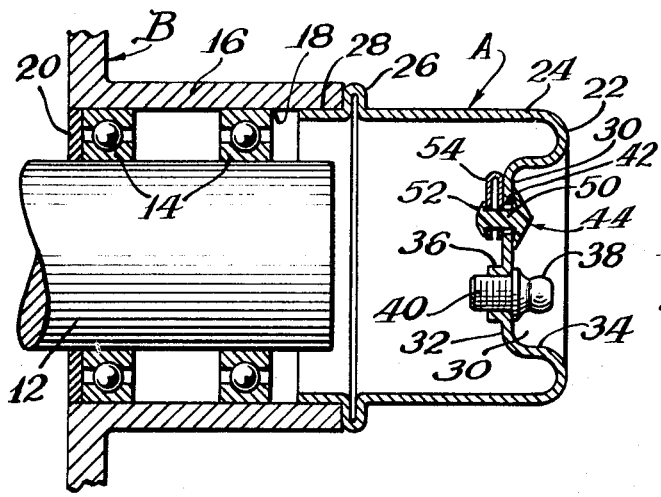
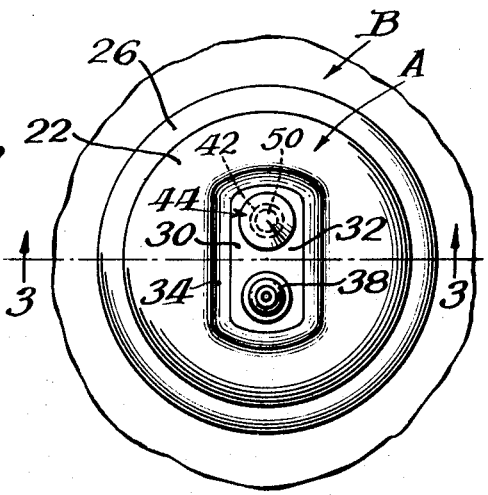
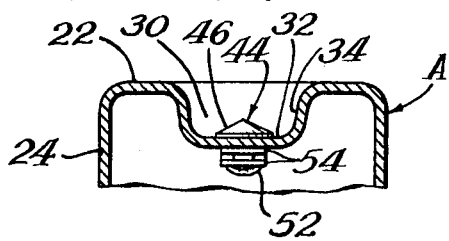
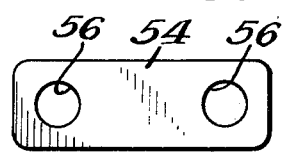
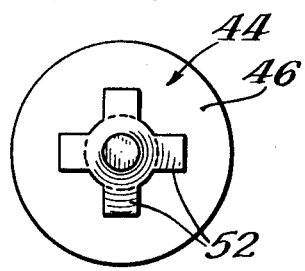
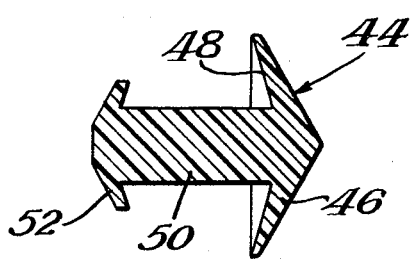
Inventor:
Anthony W. Molinare
By Molinare, Allegretti, Newitt
& Witcoff
Attys.

3,649,080

HUB CAP CONSTRUCTION

BACKGROUND OF THE INVENTION

This invention relates to a hub cap construction which is especially suitable for the wheels of boat trailers.

As is well-known, boat trailers are frequently subjected to relatively difficult environmental use. Conventional hub caps, while serving to protect the hub axle and bearing assemblies from contamination under certain conditions, are not satisfactory for protecting the hub assemblies when they are immersed in water, as occurs as a result of normal use of the boat trailer. Due to the small diameter of the wheels of a boat trailer in relation to the diameter of the wheels of a towing vehicle, the hub axle and bearing assemblies of the wheels of the trailer frequently attain relatively high temperatures, especially when the trailer is towed for several hours over highways. When such conditions exist, they tend to liquefy the lubricant and, due to centrifugal force, air and lubricant escape from within the hub cap. Frequently, after a boat trailer has been towed many miles it is then backed into cold water to facilitate the removal and floating of the boat on the water. When this occurs, the entire hub assembly is suddenly cooled, contracting the air and lubricant within the cap and around the bearing assemblies, creating a partial vacuum which causes water, sand, and other contaminates to seep into the hub cap assembly in direct contact with the axle and bearings. When water enters the hub cap assemblies, it eventually causes rust and corrosion of parts of the wheel assembly and creates serious problems for safe, efficient and continued use of the trailer.

There have been attempts made by others to overcome the above mentioned difficulties and problems, such as represented in U.S. Pat. Nos. 3,077,948 and 3,393,015. These prior constructions are not totally satisfactory either because of their being relatively complicated and expensive constructions, or because of the problem in endeavoring to provide a fine and accurate positioning of the hub cap assembly in relation to the hub of the wheel, together with the exposure of grease fittings in a location which results in their possibly being damaged by contact with other objects, as well as possible bodily injury to a person coming in contact therewith.

One of the objects of this invention is to provide a novel hub cap assembly which is of simple, inexpensive, and efficient construction, and which will serve to effectively preclude ingress of water and other contaminates into the interior of the hub cap assembly and in contact with the axle and bearing assemblies, even when it is immersed in water.

Another object is to provide an improved hub cap construction of the character indicated wherein a pressure relief valve is positioned in close proximity to a grease fitting to readily and visually indicate when the chamber of the cap is filled with grease.

A further object is to provide an improved hub cap construction wherein the body of the cap is formed as a sheet metal stamping of cup shape, and wherein the closed end wall of the cap is formed with a recess with a grease fitting and a pressure relief valve mounted in the bottom wall of the recess, within the depth of the recess, so as to protect the fitting and relief valve against damage in the event of contact of the hub cap with obstructions, and further to preclude possible bodily injury to a person moving in close proximity of the hub cap.

Other objects and advantages of this invention will be apparent from the following description, taken in connection with the accompanying drawing.

BRIEF DESCRIPTION OF THE DRAWING

FIG. 1 is an axial sectional view of the hub cap construction embodying the present invention, shown in relation to a hub assembly of a wheel.

FIG. 2 is an end elevational view of the cap in the position shown in FIG. 1.

FIG. 3 is a fragmentary, sectional view through the hub cap, taken substantially as indicated at line 3—3 on FIG. 2.

FIG. 4 is an axial sectional view of the valve element of the pressure relief valve.

FIG. 5 is an end view of the valve element shown in FIG. 4.

FIG. 6 is a plan view of a resilient strap member, forming a part of the pressure relief valve.

DESCRIPTION OF THE PREFERRED EMBODIMENT

The hub cap assembly, indicated generally at A, is attached to a wheel hub assembly indicated generally at B. The wheel hub assembly B is freely rotatable about a conventional axle 12 which is journaled in a pair of spaced-apart bearings 14, mounted in a cylindrical bore 18 of a hub 16 of the wheel hub assembly. Also mounted within the inner end of the cylindrical bore 18 of the hub 16 is a rotating seal 20, which serves to seal the lubricant within the bore of the cylindrical hub 18 and the hub cap assembly A, while permitting free rotation of the wheel hub assembly around the axle 12.

The hub cap assembly A is formed as a sheet metal stamping and is a cup-shaped formation, having a closed end wall 22 and a cylindrical side wall 24. The side wall 24 is formed to provide an outwardly extending annular flange 26, with the terminal or free end portion of the annular wall, as indicated at 28, being dimensioned for a snug, telescopic, force fit into the bore 18 of the hub 16 for securely connecting the hub cap assembly to the hub 16. The fit of the free end portion 28 of the wall of the cap in the hub is such as to insure against the escape of lubricant under pressure, as well as to preclude the entry of any foreign matter or liquid into the interior of the hub and hub cap assembly. The hub cap assembly is quickly and easily placed in operative position and connected to the hub of the wheel by starting the free end portion 28 of the side wall of the cap into the bore of the hub, and then driving the hub to its final position with the annular flange 26 seated firmly against the end of the wheel hub 16, as seen in FIG. 1 of the drawing. One simple method of attaching the hub cap assembly to the hub of the wheel, after it has been placed in registration with the bore of the hub 16, is to place a flat surfaced member against the end wall 22 of the cap and, by means of a suitable implement, such as a hammer, striking the flat surface member, to drive the cup into seated and attached relation with respect to the wheel hub 16.

The closed end wall 22 of the hub cap is formed with a recess 30, including a bottom wall 32 and side walls 34. As may be seen in FIG. 1 and 2, the recess is of generally rectangular outline and rounded contours, connect the bottom wall 32 to the side walls 34, and the latter to the closed end wall 22.

At one side of the axial center of the cap, the bottom wall 32 is pierced and extruded to form a circular flange 36, into which is drive fitted a conventional grease fitting 38. The exterior of shank portion 40 of the grease fitting is serrated so that when it is driven into the interior of the flange 36 it will be firmly and rigidly connected thereto.

Diametrically opposite to the grease fitting 38, the bottom wall 32 of the recess is formed with a vent aperture 42, for receiving a suitable pressure relief valve as indicated generally at 44. The pressure relief valve herein disclosed is for purposes of illustration only and is the subject of a copending application of Max W. Perry and Norman D. Brockelsby, Ser. No. 48,253; filed June 22, 1970, owned by the assignee of the present application. The pressure relief valve includes a valve element, as seen in FIGS. 4 and 5, molded of suitable, yieldable, synthetic plastic material, such as nylon, and includes a flattened cone-shaped valve head 46, of generally circular and conical outline, with its under surface 48 undercut so that the marginal edge of the valve head, provides a thin, flexible, marginal lip adapted to yieldingly contact the outer surface of the bottom wall 32 of the recess in surrounding and sealing relation to the vent aperture 42. The valve element has a cylindrical stem portion 50 connected at one end to the underside of the head 46, and the opposite end being formed with radially extending abutment shoulders 52, herein shown as four, which are equally spaced apart circumferentially and which define a diameter slightly greater than the diameter of the aperture 42. The diameter of the stem 50 is smaller than the diameter of the vent aperture 42 so as to insure that grease under pressure within the cap may pass through the aperture and beneath the valve head 46, and discharge beyond the lip portions of the valve head. The valve element may be quickly and easily inserted into operative relation in the vent aperture 42 by forcing the abutment shoulders 52 through the vent aperture. Suitable yielding means is then interposed between the abutment shoulders 52 at the end of the valve element, and the inner surface of the bottom wall 32, of the recess in the end wall of the cap. For this purpose there is provided an elongated strap member 54, formed of resilient, synthetic, plastic material, such as nylon, to function as a spring. The opposite ends of the strap are formed with apertures 56 of a diameter slightly greater than the diameter of the stem 50 of the valve element. The resilient strap member is adapted to be folded upon itself to provide a form similar to a hairpin, and it is placed in operative position by forcing the strap, in folded position, so that its apertures 56 yieldingly snap over the abutment shoulders 52 to assume a position on the stem 50, as seen in FIG. 1. In this position, one leg of the strap member contacts against the abutment shoulders 52, while the opposite leg abuts against the inner surface of the bottom wall 32 of the recess. The inherent resiliency in the strap 54 in such a bent form provides the desired light pressure to maintain the valve head 46 seated in sealing relation to the vent aperture 42.

Grease is introduced through the fitting 38 into the cavities of the hub cap assembly and around the axle and bearings of the wheel hub assembly, and the cavities become filled. Any further introduction of grease will build up a light pressure within the hub cap assembly and cause the excess grease to flow through the apertures 56 of the yieldable strap member, along the stem 50 of the valve element, and out through the vent aperture 42; and discharge beneath the marginal lip of the valve head 46. Thus a person filling the hub cap assembly with grease may readily and quickly observe any discharge of grease around the pressure relief valve and immediately discontinue supplying of further grease to the assembly. Also when the trailer is towed for a period of time over roads, any heating of the hub assembly, which may tend to build up pressure within the hub assembly and hub cap assembly, is readily accommodated by the pressure relief valve. However, when there is no excess pressure of lubricant within the assemblies, the pressure relief valve will preclude discharge of lubricant, due to the action of centrifugal force, even when the trailer is traveling at high speed over a road.

After the air and/or excess grease within the hub cap assembly has escaped, the pressure relief valve will serve to the thereafter seal the vent aperture 42 so as to exclude contaminants, such as dust, dirt, sand and water from entering the hub cap assembly. When the trailer, after travel over a road, is backed into the water and the hub and hub cap assemblies are suddenly cooled by the water, the vacuum created within the chamber of the hub and the chamber in the hub cap assembly, will aid the hairpin type plastic spring member 54 in maintaining the valve head 46 of the relief valve more positively seated in sealing relation to the vent aperture 42, and thus preclude ingress of water or other foreign matter into the interior of the hub cap assembly.

What is claimed is:

1. A hub cap construction comprising a cup-shaped cap, formed as a sheet metal stamping, having a closed end wall and the opposite end being open, the marginal portions of the open end of the cap being dimensioned for cooperating engagement with a wheel hub, the end wall of the cap being formed with a normally open recess defined by a bottom wall and a side wall, a pressure relief valve assembly mounted in said bottom wall of the recess at one side of the axial center line of the cap, and a grease fitting mounted in said bottom wall of the recess, at the opposite side of the axial center line of the cap, in close spaced apart relationship to the relief valve assembly, for introducing lubricant into the interior of the cap, the side wall defining the recess extending outwardly beyond the relief valve assembly and the grease fitting.

* * * * *